UNITED STATES PATENT OFFICE.

RALPH HARPER McKEE, OF RIDGEFIELD PARK, NEW JERSEY.

PROCESS OF PRODUCING 1:2:4 METHYL-HYDROXY-ISOPROPYL BENZENE.

1,265,800.

Specification of Letters Patent.

Patented May 14, 1918.

No Drawing.

Application filed April 7, 1917. Serial No. 160,493.

*To all whom it may concern:*

Be it known that I, RALPH H. McKEE, a citizen of the United States, residing at Ridgefield Park, in the county of Bergen and State of New Jersey, have invented certain new and useful Improvements in Processes of Producing 1:2:4 Methyl-Hydroxy-Isopropyl Benzene, of which the following is a specification.

This invention relates to the production of 1:2:4 methyl-hydroxy-isopropyl benzene from what is known as "spruce turpentine", a hydrocarbon oil which separates on cooling and condensing the vapors from the dry relief and from the wet relief in the manufacture of pulp from spruce and similar woods such as balsam and fir, by the sulfite process.

The "spruce turpentine" is ordinarily collected in separating funnels containing an acid solution of calcium bisulfite through which the gases and vapors from the digesters pass, the oil collecting on the surface of the acid liquor from which it is drawn off from time to time. The oil as thus obtained, contains impurities including sulfur dioxid and tarry bodies which it is desirable to remove therefrom. This purification may be advantageously effected by a single or by repeated distillation in the presence of steam, the distillation being preferably continued until about 80 or 90 per cent. of the oil is obtained as a distillate. A single distillation ordinarily yields a product sufficiently free from sulfur dioxid and tarry matters for use in the practice of my process.

The distillate is then subjected to treatment to remove water therefrom. This drying operation may be effected by passing the liquid over or through a drying agent such as calcium chlorid, or by heating it until about 2 per cent. of the product has been removed by vaporization.

In the practice of my process the "spruce turpentine" is subjected to a sulfonating treatment whereby a sulfonic acid is produced. This treatment may advantageously consist in treating the oil with approximately its own volume of concentrated sulfuric acid at ordinary temperature or at a somewhat higher temperature, the mixture of oil and acid being vigorously stirred, as will be understood by those skilled in the art.

I then form an alkali metal salt of the sulfonic acid thus produced. This may be advantageously effected by neutralizing the sulfonation mixture with an alkaline earth metal hydroxid or carbonate such for example, as calcium carbonate, filtering and to the filtrate, adding an alkali metal carbonate such as sodium carbonate, filtering a second time and evaporating the filtrate. Or I may proceed by adding to the sulfonation mixture approximately half its volume of water, stirring and allowing to stand for several hours. Of the two layers which separate, the upper is the sulfonic acid and contains relatively little sulfuric acid and water. Neutralization of this upper layer with an alkali metal hydroxid or carbonate and evaporization will yield the alkali sulfonate desired.

The sodium or potassium salt of the sulfonic acid obtained by either of the methods described is then fused with caustic alkali and a mixture of products is obtained. This mixture is dissolved in water and neutralized with an acid such for example, as sulfuric acid. As a result of this treatment there is produced an oil-like body consisting principally of 1:2:4 methyl-hydroxy-isopropyl benzene. From this crude oil, pure 1:2:4 methyl-hydroxy-isopropyl benzene is obtained by distillation.

While I have described in detail the preferred practice of my process and the proportions of materials and reagents which I employ, it is to be understood that the details of procedure and the proportions of materials may be widely varied, and that chemical equivalents of the reagents may be used without departure from the spirit of my invention or the scope of the appended claims.

Having described my invention, I claim:

1. A process of producing 1:2:4 methyl-hydroxy-isopropyl benzene which consists in subjecting "spruce turpentine" to a sulfonating treatment, producing an alkali metal salt of the sulfonic acid formed, fusing such alkali metal salt with caustic alkali and adding an acid to the resulting mass.

2. A process of producing 1:2:4 methyl-hydroxy-isopropyl benzene which consists in subjecting "spruce turpentine" to a sulfonating treatment, combining an alkali metal radical with the resulting sulfonic acid to form an alkali metal salt of such acid, fusing such salt with caustic alkali, dissolving the resulting mass and neutralizing the resulting alkaline solution.

In testimony whereof I affix my signature in presence of two witnesses.

RALPH HARPER McKEE.

Witnesses:
F. E. ALDEN,
E. H. MORSE.